(12) United States Patent
Darling

(10) Patent No.: US 8,235,329 B1
(45) Date of Patent: Aug. 7, 2012

(54) DYNAMICALLY ACTUATED ADAPTIVE CONTROL STRUCTURES

(75) Inventor: David R. Darling, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 321 days.

(21) Appl. No.: 12/476,484

(22) Filed: Jun. 2, 2009

(51) Int. Cl.
*B64C 3/00* (2006.01)
(52) U.S. Cl. .......... 244/198; 244/201; 244/203
(58) Field of Classification Search .......... 244/198, 244/199.1, 199.3, 200, 200.1, 201, 203, 204, 244/204.1, 205
See application file for complete search history.

(56) References Cited

U.S. PATENT DOCUMENTS

| | | | | |
|---|---|---|---|---|
| 5,662,294 | A | * | 9/1997 | Maclean et al. ............... 244/219 |
| 2006/0192465 | A1 | * | 8/2006 | Kornbluh et al. ............. 310/800 |
| 2006/0267376 | A1 | * | 11/2006 | McKnight et al. ......... 296/180.5 |
| 2007/0221789 | A1 | * | 9/2007 | Lee et al. ...................... 244/211 |

* cited by examiner

*Primary Examiner* — Tien Dinh
*Assistant Examiner* — Jamie S Stehle
(74) *Attorney, Agent, or Firm* — Jeffrey D. Myers; Peacock Myers, P.C.; Vernon Williams

(57) ABSTRACT

A vehicle control method (and concomitant control structure) comprising deploying an electrolaminate affixed to a substrate and using the combination to control motion of the vehicle.

24 Claims, 4 Drawing Sheets

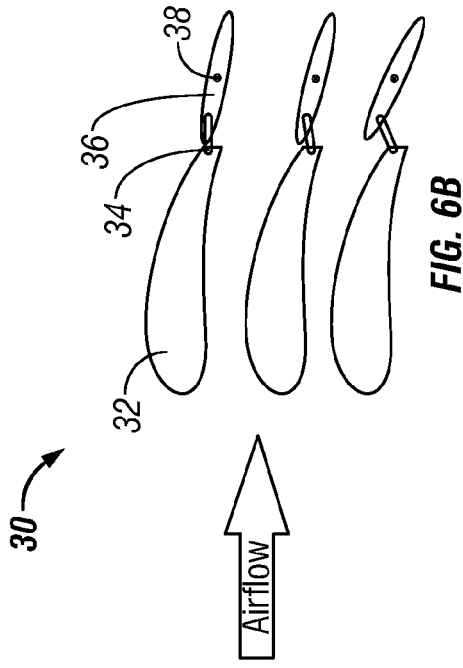
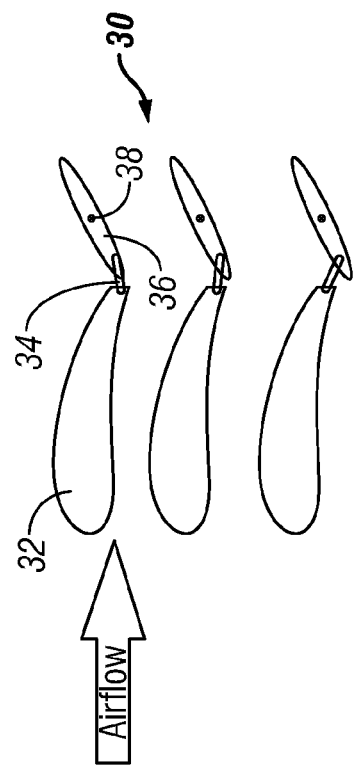
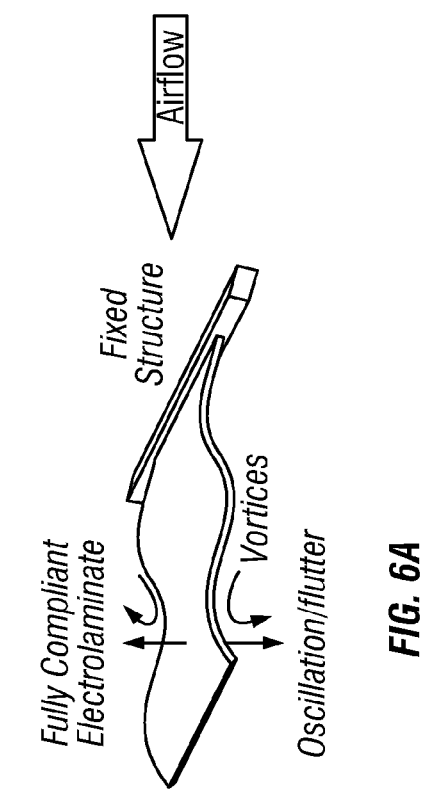
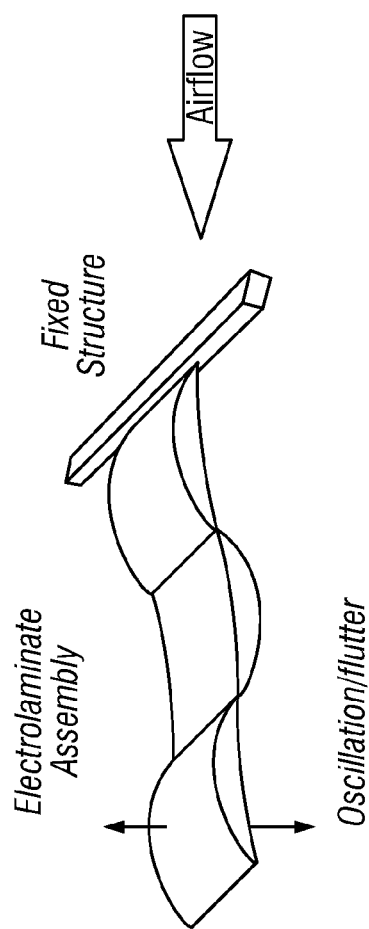

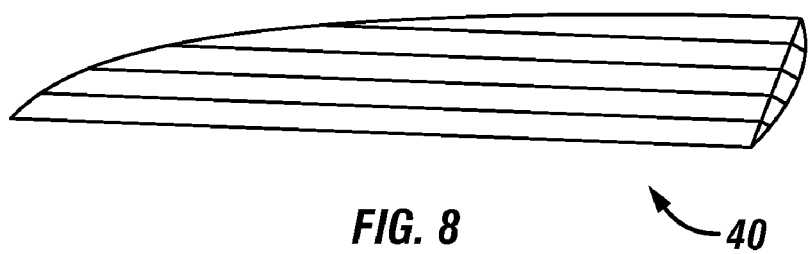
FIG. 8  ↖ 40
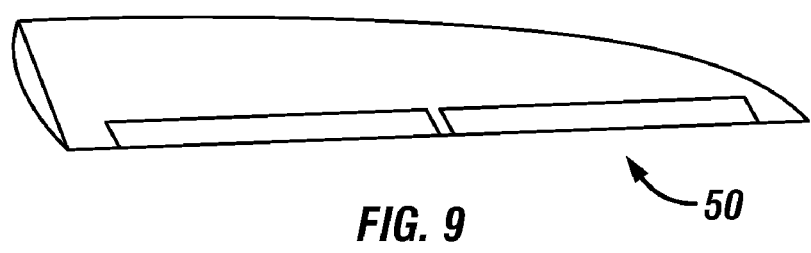
FIG. 9  ↖ 50

DYNAMICALLY ACTUATED ADAPTIVE CONTROL STRUCTURES

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to methods and apparatuses for controlling flight.

2. Description of Related Art

There is a need for vehicles of all sorts (aircraft, automobiles, underwater vessels, missiles, etc.) to become smaller, lighter, and lower cost. Furthermore, future systems will be required to morph various physical, electrical, and/or mechanical features for energy harvesting, thermal management, aerodynamics, threat response, and the like. The present invention provides a vital technology for achieving these capabilities.

BRIEF SUMMARY OF THE INVENTION

The present invention is of a vehicle control method (and concomitant control structure) comprising deploying an electrolaminate affixed to a substrate and using the combination to control motion of the vehicle. In the preferred embodiment, the electrolaminate comprises a plurality of electrolaminate scales, more preferably wherein the scales overlap one another, wherein each of the scales comprises an insulating layer and an electrically active layer, wherein the scales are affixed to a flexible substrate (most preferably wherein the scales are affixed to two sides of the flexible substrate), and wherein the scales have voltage applied to them of opposite sign to that of adjacent scales. The structure controls flight of the vehicle through a fluid, either as is a portion of a wing or as a portion of a flap or aileron.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 5 is a perspective view of the embodiment with voltage on;

FIGS. 6(a) and 6(b) are schematic presentations of an embodiment of the invention in which an electrolaminate according to the invention connects a main wing to a control surface, with the electrolaminate in fully compliant state;

FIGS. 7(a) and 7(b) are schematic presentations of the embodiment of FIGS. 6(a) and 6(b) with an electrolaminate assembly in the shown configuration in possible rigid states;

FIG. 8 is a diagram of a fully segmented wing according to the invention; and

FIG. 9 is a diagram of flap/aileron control according to the invention.

DETAILED DESCRIPTION OF THE INVENTION

Figure 1A:
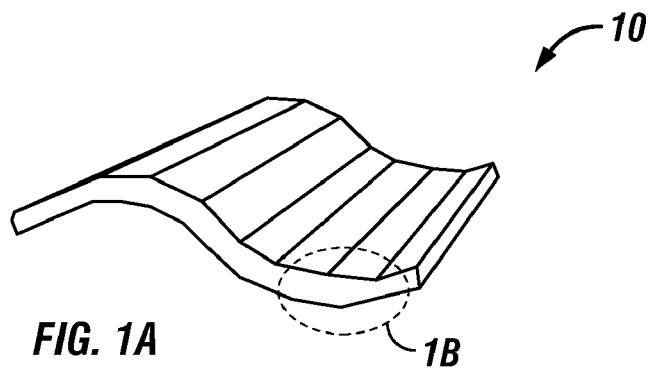
FIGS. 1(a)-1(c) are side perspective, side perspective detail, and sectional detail views of an embodiment of a control structure according to the invention.

The present invention is of apparatuses and methods for vehicle motion control comprising the use of metamaterials. For example, electroactive metamaterials, combined with dynamic flight structures, can be used to produce a new form of aero control and adaptive structures. The combination of electrolaminates and Limit Cycle Oscillation (LCO) can be used to eliminate traditional servo and motor-driven flight control hardware for in-flight aero control. LCO is designed-in aerodynamic instability, similar to wing flutter, and this oscillation movement provides the dynamic change in wing shape. The electrolaminate metamaterials according to the invention are used to lock the structure into the desired configuration. Materials potentially useful with the invention also include shape memory polymers (including memory "foam"), piezoelectric motors, electrolaminates, and bimorph composites.

For purposes of the specification and claims, a "metamaterial" is any macroscopic composite having a manmade, three-dimensional, periodic cellular architecture designed to produce an optimized combination, not available in nature, of two or more responses to specific excitation. An "electroactive metamaterial" is one in which the specific excitation is electrical signal, preferably voltage. An "electrolaminate" is a laminate material having a plurality of layers, at least one of which is an electroactive metamaterial.

Electrolaminates cannot move themselves. They use an electrostatic charge to cling to surfaces, structures, and to each other, and can generate several pounds per square inch of compressive strength. They require high voltage, up to 2,000 volts, but only require microamps of current, so they are extremely power efficient. Once actuated, they can hold their position for a relatively long time and simply releasing the voltage returns the materials back to their flexible state.

Electrolaminates are a type of meta-material (micro-structured material) developed by SRI Incorporated. In its simplest form, electrolaminates consist of sheets or scales of conductors separated by insulating material(s). When energized, the scales are electrostatically clamped together to become rigid on demand. As with most electrostatic clamping, power consumption is minimal because the only electrical losses are leakage through the insulating material. If the insulator is an elastomer, or the scales are connected to an elastomer, the electrolaminate can stretch or bend with little stiffness, yet lock in place when voltage is applied. With suitable design, the locking can be selective. That is, one area of the electrolaminate can be stiffened while another area is left compliant.

One important aspect of electrolaminates to note is that with proper design, the locked electrolaminate can be essentially as strong and rigid as the scale material. Mechanically, this configuration is analogous to carbon-epoxy composites. The epoxy is relatively weak, but it transfers the load in shear to the carbon, thus allowing the composite to approach the carbon fiber strength and strength-to-weight ratio. Similarly, electrostatic clamping in an electrolaminate is relatively weak compared to the scale material, but by transferring load in shear, the composite electrolaminate can approach the strength and strength-to-weight ratio of the scale material itself. Note also that the toughness of the electrolaminate can theoretically far surpass the toughness of the scale material. This is because the electrostatic clamping can allow slipping just below the yield strength of the scales, allowing the material to absorb large amounts of energy without plastic deformation. Roughly speaking, the elastic strength is comparable to the yield strength of the scale material, but the maximum strain is comparable to the elastomer strain.

The present invention provides, among other apparatuses and methods, a new method of aero control using a wing structure that is formed and locked into multiple configurations while in flight. Airflow-induced oscillation provides the change in wing shape, and variable stiffness electro laminate metamaterials lock it into the final, rigid shape. It preferably comprises two parts. First, electrolaminates provide a clamping force to overcome aero loading during flight, with multiple layers used to increase the clamping force. Locking can be selective (one area can be stiffened while another area is left compliant), and the locked electro laminate is essentially as strong and rigid as the scale material. Second, electrolaminates cannot move or actuate by themselves, so actuation must be performed by using aero-induced LCO, which is a method of using airflow over a wing to produce cyclic oscillation of the entire wing or part of the wing, which then can be sensed and used to generate changes in the wing shape or chord.

Accordingly, electroactive metamaterials, combined with dynamic flight structures, can be used to produce a new form of aerocontrol and adaptive structures that can eliminate traditional servo and motor-driven flight control hardware for in-flight aerocontrol. Aerodynamic limit cycle oscillation, is used to generate dynamic change in wing shape, and electrolaminate metamaterials lock the structure into the desired configuration.

The present invention addresses the problem of complex, relatively heavy and electrically noisy wing, flap, and aileron motors, servos, gearing, linkages, and supporting spars and stringers. Dynamic aerocontrol is provided using airflow induced wing modification that can be formed and locked into multiple configurations while in flight.

This technology can be applied to both new and existing designs. Successful development can be used to produce a whole new class of flight controls for vehicles such as delta wing gliders, lighter than air ships, and ornithopters. The present invention can also be used to provide more stealthy autonomous flight vehicles due to reduced number of surface discontinuities and internal support structures such as spars, stringers, bulkheads, etc. Electrolaminates provide variable stiffness control, energy absorption, and damping. They may also be applied to undersea vehicles for virtually silent operation.

Figure 1B:
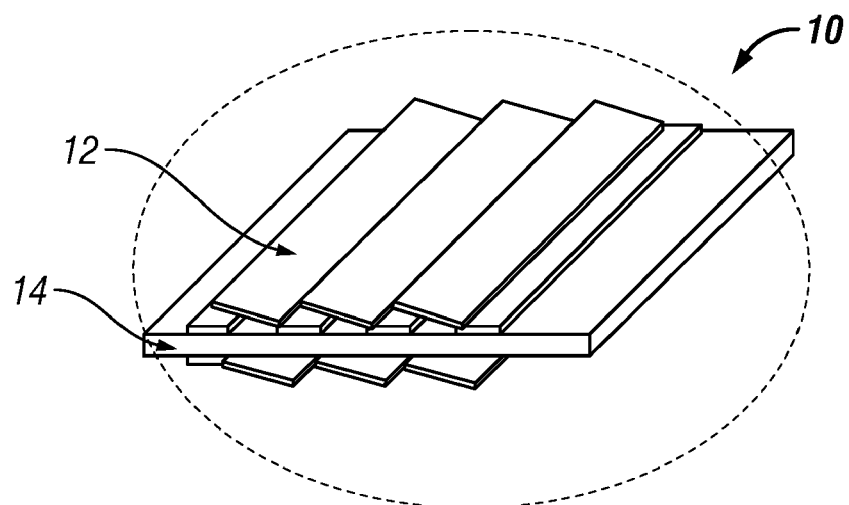
Figure 1C:
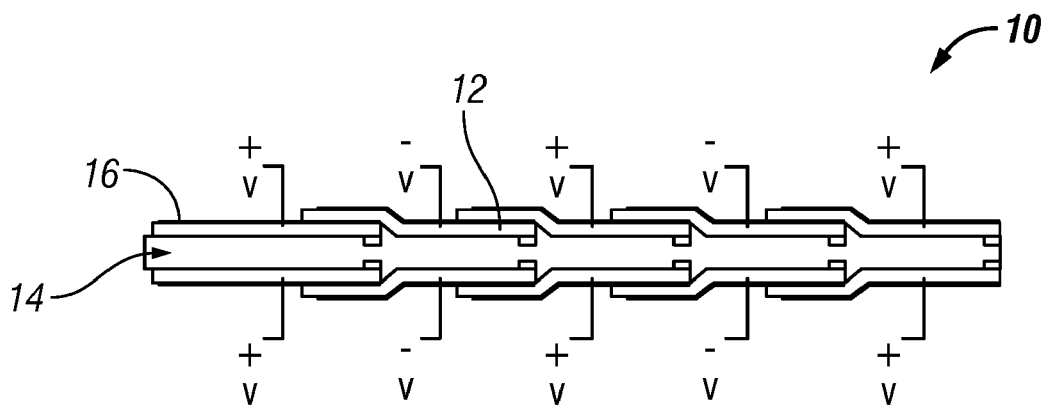
Figure 2:
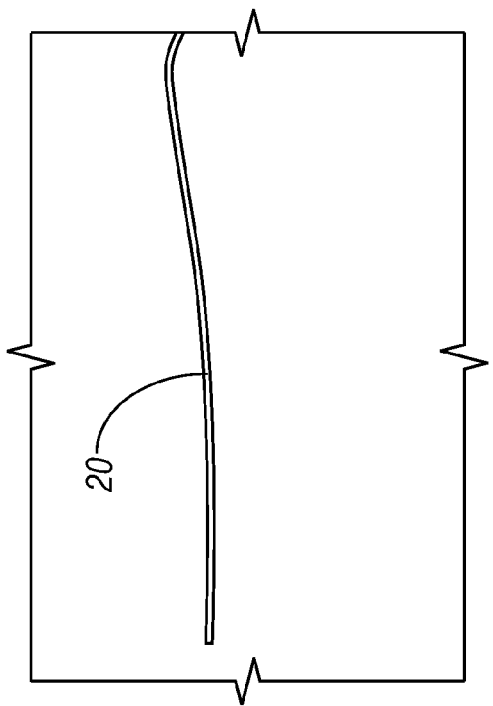
FIG. 2 is a side view of the embodiment with voltage off (flexible)
Figure 4:
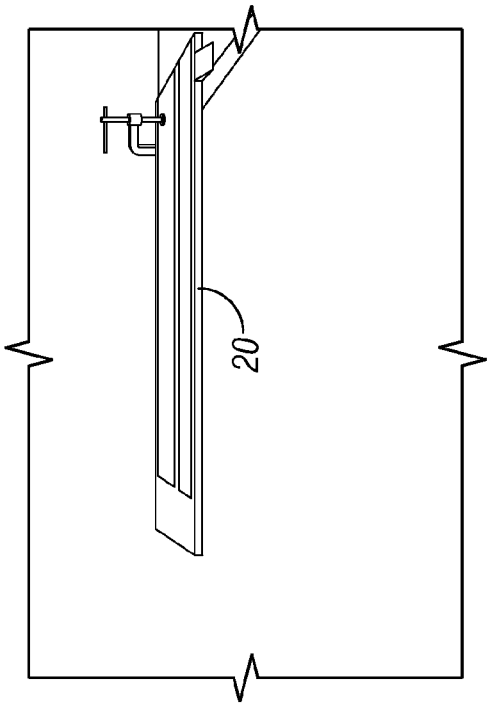
FIG. 4 is a side view of the embodiment with voltage on (locked)
Figure 3:
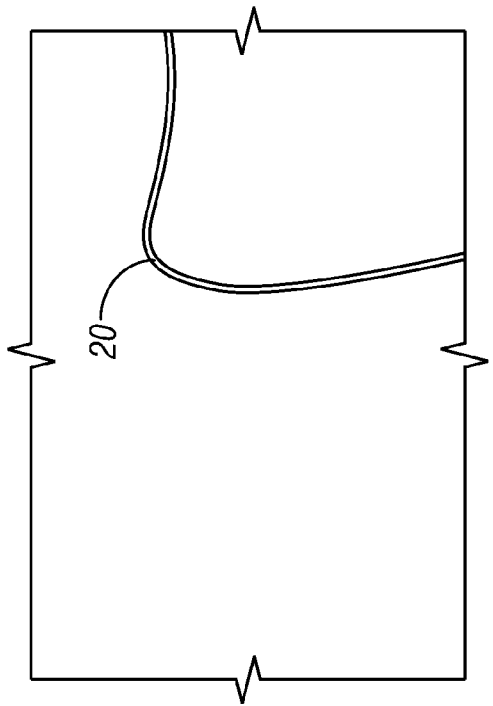
FIG. 3 is a perspective view of the embodiment with voltage off.
Figure 5:
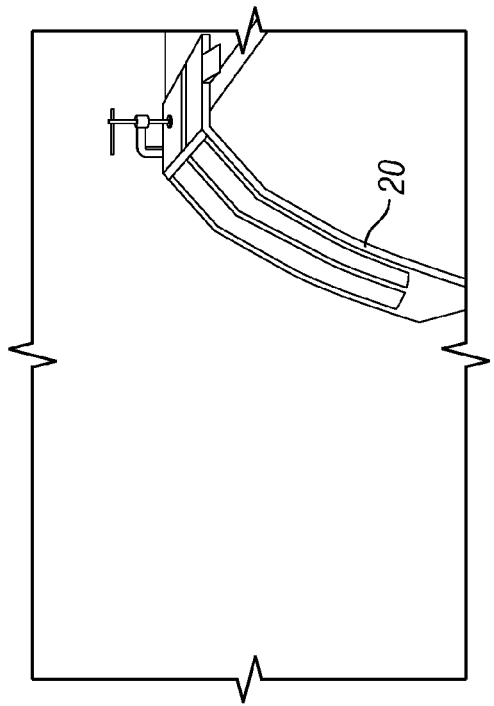

FIGS. 1(a)-1(c) illustrate the structure and function of a "fish scale" embodiment 10 of the invention. Sheets or scales of conductors 12 are employed and attached to a more compliant substrate, such as a metal or an elastomer, separated by insulating material(s) 16. Voltages are preferably applied as shown in FIG. 1(c). This embodiment provides for energized electrostatic clamping, which requires minimal power consumption with low current leakage. The invention functions with both elastomers and metals. FIGS. 2-5 illustrate a segmented control structure 20 as shown and described in both relaxed (FIGS. 2-3) and rigid (FIGS. 4-5) states.

FIGS. 6(a), 6(b), 7(a), and 7(b) illustrate another embodiment 30 of the invention comprising main wing 32, electrolaminate 34 (which can lock angles through torsional stiffness control), and control surface 36 with center of mass 38. FIGS. 6(a) and 6(b) show the electrolaminate as fully compliant, providing for one form of oscillation/flutter in an airflow. FIGS. 7(a) and 7(b) show the electrolaminate as stiffened to a desired shape, thereby providing a different oscillation/flutter in the airflow. The combination of electrolaminates, and the use of wing flutter, or more appropriately Limit Cycle Oscillation (LCO), can be used together to create a flight control structure that can be light, flexible, and controllable. In this approach, the electrolaminate material can be applied above and below a UAV's wing/flap joint. Gravity is initially be used to pull the inactive electrolaminate aileron/flap into a downward) (−23° position and then it is locked into place using the electrolaminates. After takeoff (and when landing) the electrolaminates are inactivated, allowing the airflow to oscillate the aileron/flap and, when the aileron/flap achieves the desired angle, the electrolaminate locks the control element into that position. When turning, climbing, and descending, the same process is followed. With an estimated 100 times a second speed of oscillation, this appears as an almost instantaneous and fluid movement of the control surface. The energy from the airflow over the wing is therefore preferably extracted to provide the actuation of the system.

FIG. 8 illustrates a fully segmented wing 40 which can be constructed with the materials of the invention, with each segment being independently controllable. FIG. 9 illustrates a wing comprising flap/aileron control 50 in which the flaps are likewise independently controllable. The flaps are preferably designed to controllably oscillate naturally in airflow except when locked by an electrolaminate according to the invention. Conventionally the flap remains stiff and then is moved by actuators doing work against the airflow.

The present invention provides at least the following abilities and advantages: (1) The use of electrolaminates to clamp a flexible structure into a rigid shape. (2) The use of dynamic wing oscillation to actuate a change in wing shape. (3) Current solutions all use electrical and mechanical actuators to lever a flap or aileron into the airstream to provide control. (4) An estimated cost reduction of a vehicle's cost can be reduced through component and supporting hardware elimination. (5) Development of high-performance, dynamically unstable, and highly maneuverable aircraft can also provide significant performance improvements and create new products/markets. (6) The performance improvement could also be even more dramatic if combined with other aerocontrol methods such as swept wings, wing warping, and thrust vectoring.

The invention is applicable to all types of control and lift surfaces such as wings, flaps, ailerons, lifting bodies, sails, fins, spoilers, rudders, etc. The invention can also be applied to undersea vehicles such as submarines and missiles for attitude control and virtually silent operation.

Other wing control actuation configurations can be incorporated with the invention such as the following types of control actuators: CNT bimorph (airfoil morph; CNT bimorph (aileron morph); Linear SMP (actuator); Disc SMP (actuator); and Electrolaminate bimorph (clamp). For example, a warping wing and/or rudder can be provided by CNT bimorph and/or CNT memory foam where the actuator moves the structure and the electrolaminate then locks it into shape.

Although this invention is applicable to existing products, it would be best applied in new products to best take advantage of the unique material properties. Additional applications include shape changing/absorbing/reflecting skins, and smooth, noiseless, non-motorized gimbals.

INDUSTRIAL APPLICABILITY

The invention is further illustrated by the following non-limiting example.

Example 1

Applicants generated a design integrating electrolaminates into a wing/flap configuration and modeled, simulated, and wind tunnel tested the wing and control element (flap/aileron) shapes to induce and characterize LCO. In a commercial embodiment, a feedback sensored control system would preferably be employed with such a configuration, such as one of the standard, closed-loop, feedback control techniques such as eigenstructure assignment, LQG/LTR, H-infinity, and structured singular-value synthesis.

Design goals were established to ensure that the electrolaminate design is able to maintain flap position under low speed aerodynamic loads of up to 32 m/s. Corresponding maximum flap moments must be resisted and the electrolaminate switch on and off should be fast enough to allow locking in spite of rapid flutter speeds. Also, the design application should be as low profile, low power, and lightweight as possible.

In the initial configuration, the electrolaminate was made of 2 straps consisting of elastic and rigid elements in series with each other. The elastic elements are used primarily to keep the materials flat and provide a balanced preload. A normal load path would go through the series elastic elements. The rigid elements are conductive and have an insulator between them. On applying high voltage, low current, electrostatic attraction causes them to clamp together. Load path in this configuration goes through the rigid elements. Note—the elastic elements can be arbitrarily soft, and in some cases eliminated altogether.

Activation and electrolaminate response time of the material are critical to ensure the electrolaminates could activate and lock in at a specific position or angle. This was based on the total amount of capacitance and surface area of metamaterial required, the positioning and resistance of the electrical contacts with the electrolaminates, and the power supply voltage and current capacity.

Another significant issue that must be determined for the control of Limit Cycle Oscillation is that an aircraft's structure and weight can vary the stiffness of aircraft wings. Wings that are more flexible can easily bend and twist under the influence of airloads. Although the static airloads on the wing are always less than its structural strength, once the wing begins to twist and bend in a periodic manner, under certain conditions the dynamic airloads may begin feeding the elastic motion of the wing, causing its amplitude to grow, which in turn causes increased airloads that eventually exceed the structural strength. Such a catastrophic dynamic coupling between the elastic motion and the unsteady aerodynamic loading is called "flutter."

In an aeroelastically stable system positive work is done on the airstream by the lifting surface. In an aeroelastically unstable system, positive work is being done on the lifting surface by the airstream. By designing an aeroelastically unstable system, one can extract energy directly from the airstream. The LCO induced dynamic movement is effectively an unstable system that exhibits a predictable and controllable limit-cycle oscillation through the limiting of the amplitude of the oscillations and dissipation and conservation of the excess energy.

As air flows over and around the wing, it induces trailing vortices. These vortices are shed at the stops on the airfoil which creates the oscillations. One can control these oscillations through control surface design (mass, camber, and stiffness), and the flow effects (system stability, damping, dynamic pressure, Mach number, measured amounts of control surface freeplay).

The wing itself does not bend, stretch, and contract in this design. All forces acting on the wing and flap are generated by a combination of the airflow, its speed, the stiffness of the wing and flap, the weighting of the flap, and the moment of inertia typically induced by, and from changes in, the angle of attack.

Concerning the effects of using electrolaminate material on radar cross section (RCS), there is some potential for improvement due to the removal of gaps and seams around the flap/wing interface. The materials used in the electrolaminates are similar to, or the same as other aircraft structural materials (metals and non-metals), and can be coated if necessary. It may reduce the RCS due to the reduction in gaps or edges.

In event of momentary electrical power loss, then the control element (flaps, ailerons) will release and will move freely however, the aircraft will continue to fly at the same attitude (since the control elements are used to change the vehicle's attitude). Once power is restored, the electrolaminates can be quickly re-locked.

In determining when to lock the wing, the control system preferably would sense the position, or the position and direction of movement (in degrees of angle), of the control element as it moves through its oscillation. There are a number of sensor system designs (MEMS accelerometer, laser, Hall effect, etc.), that have already been used in other systems that may be employed.

For a single degree of freedom, the location of the center of gravity is not explicitly important. Rotational moment of inertia of the flap (about its rotation axis) and coulomb friction come into play, but have a negligible effect, especially if tolerances are not tight.

The electrolaminates require very low power since the overlapping scales form a capacitor with negligible leakage. However, some peak power at high voltage is needed to turn the clamp on fast enough for locking. Either DC or AC actuation can be used to control the position of a flap at low or high speeds, depending on flight control requirements.

It was shown that, under varying conditions and configurations, energy could be extracted from the airstream and used to generate flap movement. Changing the angle of attack (pitch) of the wing, airspeed, and flap center of mass resulted in varying ranges and frequencies of movement. A linear approximation of oscillation frequency was generated and sustained LCO for nearly all wing angle/flap weighting conditions at speeds The preceding example can be repeated with similar success by substituting the generically or specifically described variables and/or operating conditions of this invention for those used in the preceding example.

Note that in the specification and claims, "about" or "approximately" means within twenty percent (20%) of the numerical amount cited.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A vehicle control structure comprising a substrate, an electrolaminate affixed to said substrate, an attachment portion connecting said substrate to a vehicle, and a control system sensing a position of the electrolaminate, wherein a shape of said structure is modifiable by externally induced cyclic oscillation with locking of said structure into a desired shape when said desired shape is sensed by said control system during said cyclic oscillation.

2. The structure of claim 1 comprising a plurality of electrolaminate scales.

3. The structure of claim 2 wherein said scales overlap one another.

4. The structure of claim 3 wherein each of said scales comprises an insulating layer and an electrically active layer.

5. The structure of claim 3 wherein said scales are affixed to a flexible substrate.

6. The structure of claim 5 wherein said scales are affixed to two sides of said flexible substrate.

7. The structure of claim 3 wherein said scales have voltage applied to them of opposite sign to that of adjacent scales.

8. The structure of claim 1 wherein said structure controls flight of the vehicle through a fluid.

9. The structure of claim 8 wherein said structure is a portion of a wing.

10. The structure of claim 8 wherein said structure is a portion of a flap or aileron.

11. The structure of claim 1 wherein a shape of said structure is modified by externally induced cyclic oscillation by movement of said structure through a medium.

12. The structure of claim 11 additionally comprising an internal mechanical, electrical, or electromagnetic device to control said induced cyclic oscillation.

13. A vehicle control method comprising deploying an electrolaminate affixed to a substrate and using the combination to control motion of the vehicle, sensing a position of the electrolaminate via a control system, and modifying a shape of the combination by externally induced cyclic oscillation with locking into a desired shape when the desired shape is sensed by the control system during the cyclic oscillation.

14. The method of claim 13 wherein the electrolaminate comprises a plurality of electrolaminate scales.

15. The method of claim 14 wherein the scales overlap one another.

16. The method of claim 15 wherein each of the scales comprises an insulating layer and an electrically active layer.

17. The method of claim 15 wherein the scales are affixed to a flexible substrate.

18. The method of claim 17 wherein the scales are affixed to two sides of the flexible substrate.

19. The method of claim 15 wherein the scales have voltage applied to them of opposite sign to that of adjacent scales.

20. The method of claim 13 wherein the structure controls flight of the vehicle through a fluid.

21. The method of claim 20 wherein the structure is a portion of a wing.

22. The method of claim 20 wherein the structure is a portion of a flap or aileron.

23. The method of claim 13 wherein modifying a shape of the combination by externally induced cyclic oscillation comprises moving the vehicle through a medium.

24. The method of claim 23 additionally comprising controlling the induced cyclic oscillation via an internal mechanical, electrical, or electromagnetic device.

* * * * *